United States Patent [19]
Kreps

[11] 3,783,675
[45] Jan. 8, 1974

[54] AUTOMATIC WATER HEATER CONTROL TEMPERATURE CALIBRATION MEANS

[75] Inventor: Emmett E. Kreps, Lynwood, Calif.

[73] Assignee: Robertshaw Controls Company, Richmond, Va.

[22] Filed: Oct. 4, 1971

[21] Appl. No.: 185,975

[52] U.S. Cl. .................................................. 73/1 F
[51] Int. Cl. ............................................ G01k 15/00
[58] Field of Search .................................... 73/1 F

[56] References Cited
UNITED STATES PATENTS
| | | | |
|---|---|---|---|
| 2,724,961 | 11/1955 | Logue | 73/1 F |
| 3,347,085 | 10/1967 | Harris | 73/1 F |
| 3,636,622 | 1/1972 | Schmitt | 73/1 F |

*Primary Examiner*—S. Clement Swisher
*Attorney*—Anthony A. O'Brien

[57] ABSTRACT

An assembly is disclosed for automatically calibrating water heater controls and like controls having a clutch spring disposed in friction engagement about a temperature control shaft and adopted to carry a suitable adjusting knob. The calibraion assembly includes a temperature-to-motion transducer and a calibration lockup head which cooperate to sense ambient temperature, seize the clutch spring and position the same to a dial position corresponding to the sensed ambient temperature. A motor is also included and is driven by a flow sensing control device to rotate the control shaft for opening and closing the water heater control valve several times before the clutch spring is set at the proper control point.

13 Claims, 4 Drawing Figures

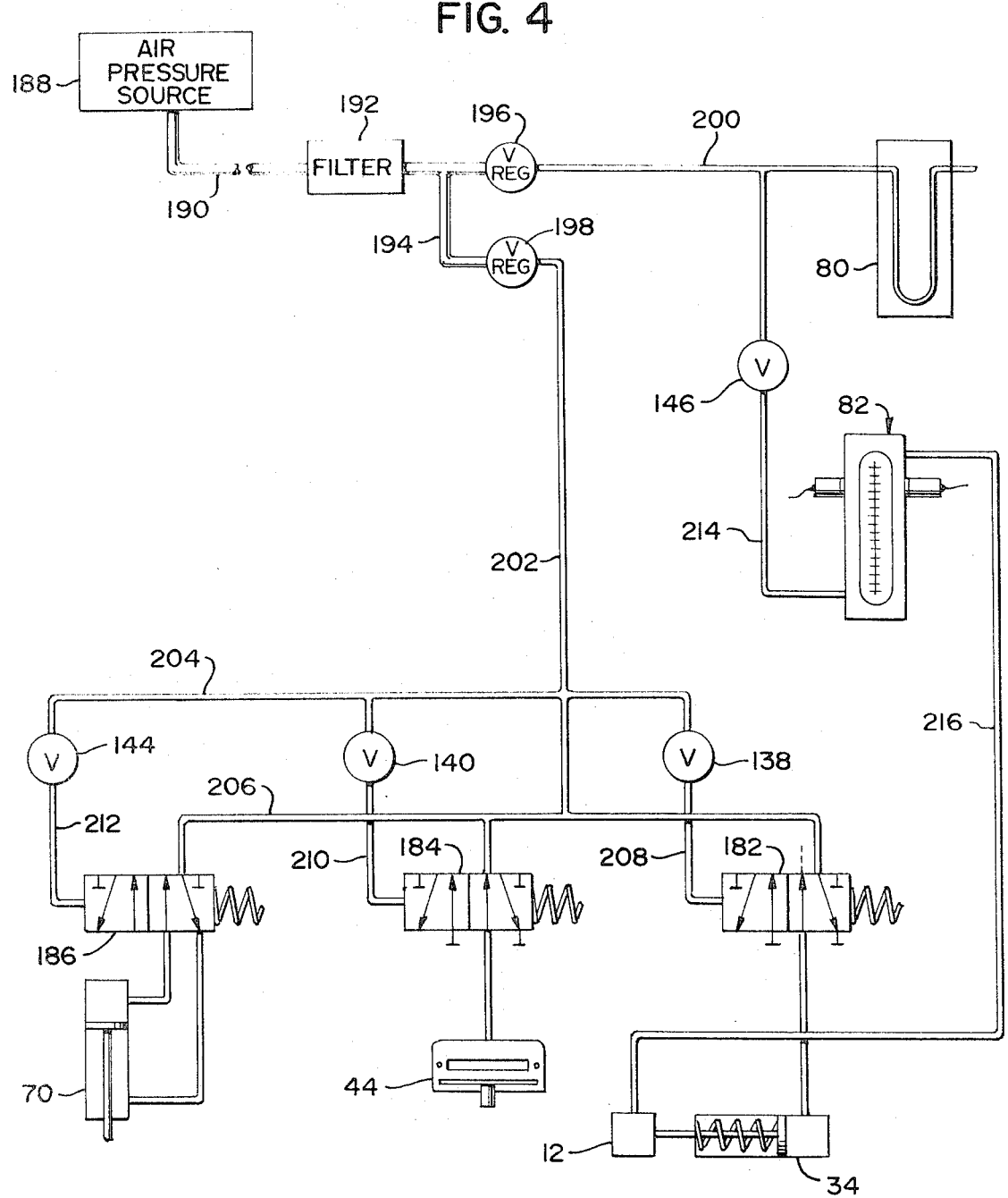

AUTOMATIC WATER HEATER CONTROL TEMPERATURE CALIBRATION MEANS

BACKGROUND OF THE INVENTION

1. Field of the Invention

The present invention relates to an improved device for automatically calibrating water heater controls and like controls with respect to normal ambient air temperature and more particularly to a device having an ambient air temperature sensor, means to translate the sensed temperature to motion which is transmitted to the control being calibrated, and means to detect precisely when the control being calibrated is in a controlling position corresponding to the sensed temperature.

2. Description of the Prior Art

In the past, calibration of water heater and similar controls has been accomplished by immersing the rod and tube thermal element of the control in water, the temperature of which is the same as the desired "off" point of the control. The clutch or similar locking device was then manually positioned to a location corresponding to the known temperature of the water. The temperature of the water in the calibration tank had to be closely maintained in order to obtain any degree of accuracy.

Thermostatically operated control devices, such as water heater thermostats and space thermostats, have also been calibrated in the environment in which they are used. That is, calibration is performed after installation of the thermostat in order that any adverse effects from handling during installation may be obviated. Such thermostat devices have necessarily been provided with relatively complex calibration assemblies, and calibration procedures have been more complex than is desirable.

More specifically for water heater applications, rod and tube thermal element thermostats are normally utilized to control a valve means in accordance with temperature variations of the water in the water heater tank. The rod normally operates, at an intermediate position, on a lever which has an operating end controlling the valve means through a snap-acting actuation mechanism and a fulcrum end, which is positioned in accordance with desired water temperature to be maintained in the water heater. The fulcrum end normally receives an extension rod which is mounted in a casing to abut a temperature adjustment screw. The temperature adjustment screw is used to hold a stop member in place by engagement with a nut threaded on a projecting end of the adjustment screw.

In order to calibrate such a water heater thermostat, the nut is tightened to secure the stop and the water temperature, to which the rod and tube are subjected, is determined. The stop member is then turned, by means of a dial, in a first direction to snap the valve means open and then in the other direction to snap the valve means closed. The position of the dial when the valve means is closed is determined and the nut is loosened so that the dial and stop may be moved to a position corresponding to the existing known water temperature. The nut is then retightened and calibration of the thermostat is completed. Reference is made to U. S. Pat. No. 2,953,937 to W. F. Jackson et al. for a more detailed description of the above-described prior art calibration assembly and procedure.

Known space thermostats have normally utilized spring washers to provide relative movement between a cam follower and a rotatable member to permit calibration of the thermostat. The use of such washers requires relatively complex structure and assembly steps due to the need for staking operations and spacing washers. Reference is made to U. S. Pat. No. 3,190,988 to M. M. Graham et al. for a more detailed description of prior art calibration for space thermostats.

SUMMARY OF THE INVENTION

It is therefore an object of the present invention to overcome the requirement of the prior art to have manual calibration and to provide an apparatus for accurate automatic calibration of automatic water heater and the like controls.

It is another object of the present invention to provide a device which will carry out calibration of water heater and like controls at ambient room temperatures.

It is a further object of the present invention to provide an automatic temperature calibration apparatus which may be readily and economically produced.

The present calibrating assembly is particularly suitable fo calibrating thermostatic controls of the type having a control device movable between controlling positions, temperature sensing means connected to the control device for moving it between controlling positions in response to variations from a predetermined temperature, temperature setting means for positioning the same at the predetermined temperature and including a rotatable adjustment member having a cylindrical clutch surface frictionally engaged by a cylindrical clutch spring to rotate as a unit to set the sensing means at the predetermined temperature. The clutch spring has means which permit release of the clutch from frictional engagement with the adjustment member and allow relative movement therebetween and thus calibration of the control. An example of this type of control is shown in U.S. Pat. No. 3,683,304.

The present invention is characterized by an assembly which senses ambient air temperatures and locks the calibration head at a corresponding angular position. The control is closed-off and its valve systematically opened and closed to allow the control parts to seat themselves in a stabilized condition. The angular position of the calibration head is then used to properly position the adjustment portion of the control for the sensed ambient temperature.

BRIEF DESCRIPTION OF THE DRAWINGS

Other objects and advantages will become apparent from the following description taken in connection with the accompanying drawings, dealing with a basic embodiment of the present invention. Reference is now made to the drawings in which:

FIG. 4 is a schematic of the fluid circuit for the automatic control calibrator of the present invention.

DESCRIPTION OF THE PREFERRED EMBODIMENT

Figure 1:
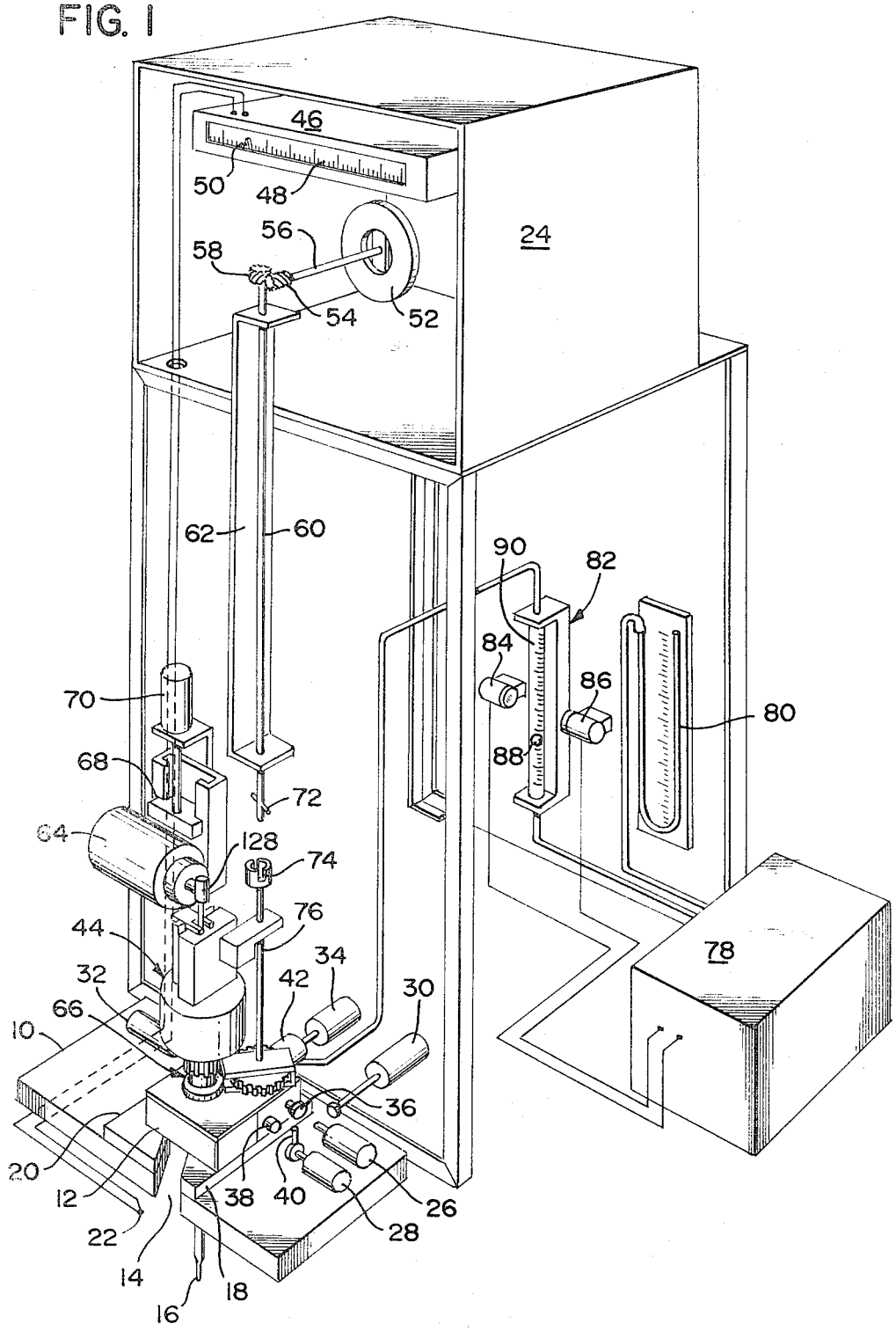
FIG. 1 is a perspective view of the calibration apparatus, with portions of the electrical and pneumatic circuits being omitted for clarity.

The apparatus is shown in FIG. 1 with a control 12 positioned on table 10 ready to be calibrated. The table is provided with a slot 14 through which the rod and tube thermal element 16 of the control 12 passes. The table may also be provided with any suitable means, such as the blocks 18 and 20, for aligning the control on the table. A temperature sensing probe 22 is positioned beneath the table in the immediate vicinity of the rod and tube thermal element 16 of the control under test. The temperature sensing probe 22 is electrically connected to a temperature-to-motion transducer 24 which is of a known type and only schematically represented. The table 10 is completed by a series of piston cylinder devices 26, 28, 30, 32 and 34 which, respectively, serve to depress the pilot button 36, engage the "on" control 38, rotate the "on" control by engaging a lever 40 on the piston-cylinder device 28, close-off the pilot outlet port, not shown, and secure a coupling 42 to the inlet, not shown, of the control for feeding pressurized fluid to the control.

The temperature-to-motion transducer 24 serves to sense ambient room temperature by probe 22 and translate this measurement to a rotary drive motion which is transmitted to the calibration lockup head assembly 44. Only a portion of the known temperature-to-motion transudcer has been shown, namely, the housing 46 enclosing an electrical bridge cicuit, not shown, and having a scale 48 and pointer 50 on a viewable side thereof and the last of the gear train including gears 52 and 54 mounted on opposite ends of shaft 56. Gear 54 meshes with gear 58 on one end of drive rod 60 which is suitably mounted in frame 62 for rotation about a vertical axis.

The calibration lockup head assembly, generally indicated by the reference numeral 44, includes a motor 64 and a screwdriver system 66 adapted to alternately rotate the temperature adjustment screw, not shown, of the control being calibrated in order to open and close the control's thermostatic valve. The calibration lockup head assembly is mounted in frame means, not shown, for vertical movement which is guided by slide assembly 68 controlled by the fluid actuated piston cylinder device 70. The slide assembly is capable of a limited amount of vertical motion so that the calibration lockup head can be raised to free the control 12 and subsequently lowered to engage the next control. The drive rod 60 is provided with a coupling 72 for engaging with coupling 74 on a lockup head drive rod 76 when the assembly is in its raised position.

Figure 3:
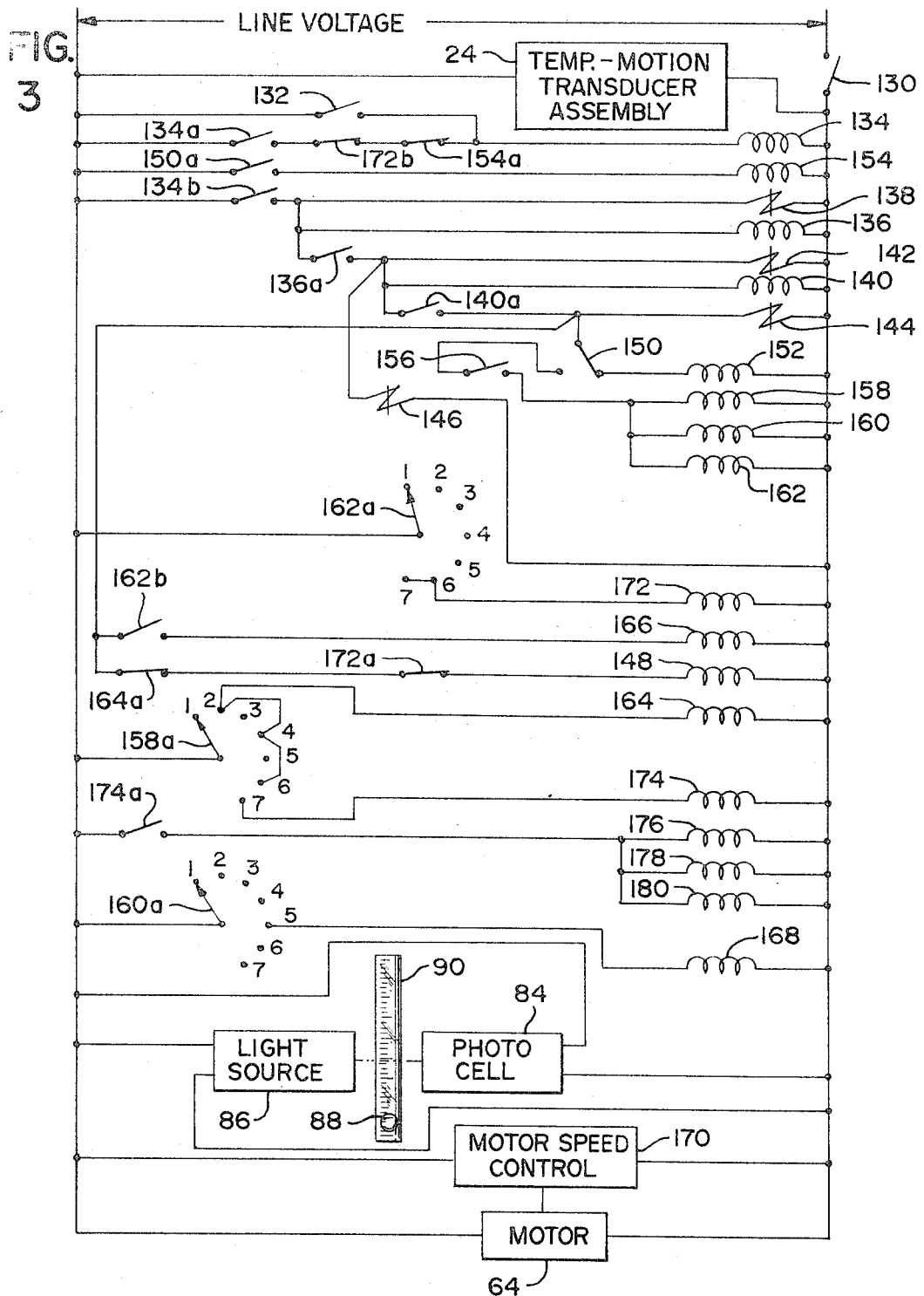
FIG. 3 is an electrical schematic of the calibration apparatus.

The remaining portions of the present invention shown in FIG. 1 include a control box 78 which contains most of the electrical circuitry, shown in FIG. 3, and controls the fluid pressure supply to the control being calibrated, drives the temperature adjustment screw and locks up the control calibration head during calibration. A manometer 80 measures the fluid pressure developed in the system. The flowrater assembly 82 includes an electric eye sensor 84 and light source 86 to sense the passage of ball 88 in tube 90 which indicates fluid flow through the control being calibrated.

Figure 2:
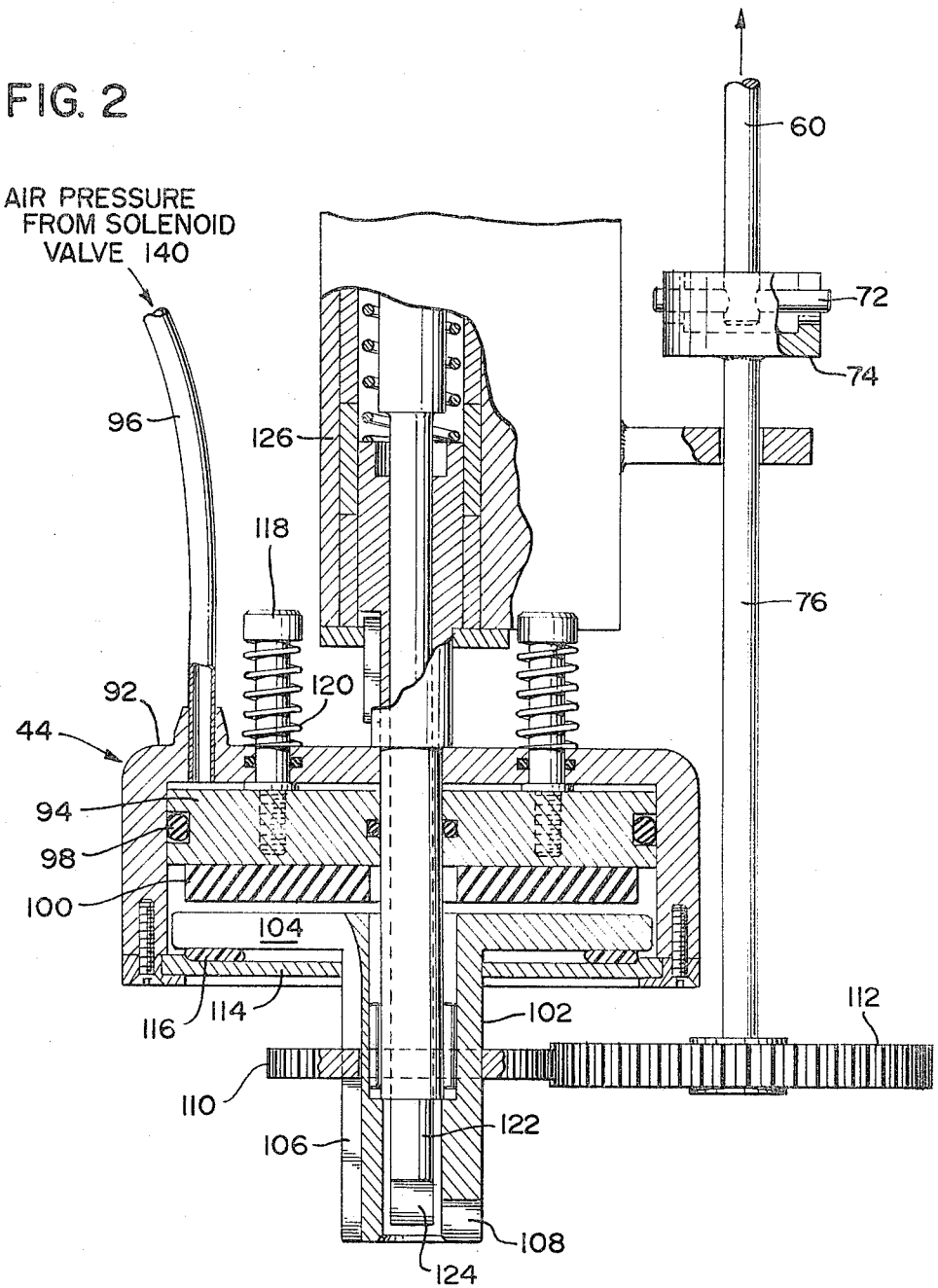
FIG. 2 is a vertical section through the calibration lockup head.

The calibration lockup head assembly 44, shown in detail in FIG. 2, is a complete unit in itself and serves to hold the control and to rotate its clutch spring to a position which corresponds to the sensed ambient room temperature. The lockup head assembly has a built-in air cylinder formed by casing 92 having piston 94 movably mounted therein. Conduit 96 is connected to feed pressurized fluid to the piston cylinder arrangement. The piston 94 is provided with an O-ring 98 and a rubber gasket 100. The gasket 100 is adapted to frictionally engage a member 102 which has a flange portion 104 integral and concentric with a cylindrical portion 106, the lower end of which is slotted at 108. A gear 110 is fixed to the outer surface of cylindrical portion 106 and meshes with gear 112 fixed at the end of drive shaft 76.

Casing 92 is closed at its lower end by plate 114. An annular member 116 is positioned between plate 114 and flange portion 104 and serves both as a bearing during rotation of member 102 and cushion when piston 94 is moved downward.

A number of pins 118 pass through the casing 92 and engage with the piston 94. These pins are biased by springs 120 and serve to keep the piston 94 normally in the upper position, as shown, and level throughout the length of its travel.

Shaft 122 passes vertically through piston 94 and member 102 and has its lower end formed with screwdriver tip 124. The upper end of shaft 122 passes through housing 126 and is drivingly coupled to motor 64 by gear means 128 (FIG. 1).

The electrical circuit, shown schematically in FIG. 3, includes power switch 130 to energize the system by connecting it to the source of power, not shown. Closing of the power switch 130 energizes the temeprature-to-motion transducer assembly 24 so that readings of ambient temperature can commence immediately. The start switch 132 is closed after a control 12 has been positioned on the table 10. Closure of the start switch 132 energizes the start relay 134 which closes start relay contacts 134a, which completes a path to hold start relay 134 energized, and 134b, which energizes the first time delay relay 136 and first solenoid valve 138. When solenoid valve 138 is energized, it actuates pistion cylinder devices 26, 28, 30 32 and 34 to close-off the control to be calibrated. When first time delay relay 136 times out, its contact 136a closes to energize second time delay relay 140 and second solenoid valve 142 which in turn locks up the calibration head by supplying pressure to conduit 96 driving piston 94 downward against member 102. When second time delay relay 140 times out, its contact 140a closes to energize third solenoid valve 144 which actuates piston cylinder deivce 70 to lower the calibration head assembly to engage control 12 and turn on the test air to the control inlet by energizing fourth solenoid valve 146. Air flow through the flowrater assembly 86 moves the ball 88 to the top of the tube 90. The closing of contacts 140a also energize forward motor relay 148 to the start motor 64 driving in the forward direction. If the screwdriver blade 124 does not seat properly in the control, the position sensing switch 150 is not actuated and when third time delay relay 152 times out, all previously sequenced closed switches are opened by closure of contact 152a which energizes abort relay 154 to open contact 154a.

If the position sensing switch 150 is actuated by proper seating of the screwdriver blade, forward rotation of the screwdriver turns the calibration screw in the control clockwise to close the control thermostatic valve. This shuts off the flow of air causing the flowrater ball 88 to drop breaking the photo-switch light path and close the photo-switch contact 156, which energizes stepping relay coils 158, 160 and 162 to move their respective contacts 158a, 160a and 162a to second position.

Stepping relay contact 158a in its second position energizes the select relay 164 to open contact 164a and close contact 164b. This causes forward motor relay 148 to be deenergized and reverse motion relay 166 to be energized to reverse screwdriver rotation to turn counterclockwise and open thp thermostatic valve in the control which permits air to again flow through the flowrater assembly 82. Ball 88 is again driven upward through photo-switch closing photo-switch contact 156 which again energize the stepping relays 158, 160, and 162. Two complete cycles of forward (clockwise) and reverse (counterclockwise) rotation of the screwdriver complete the precalibration operation. Each opening and closing sequence advances the stepping relay contacts one position clockwise so that at the end of the second "off" cycle, the stepping relays are in position 5. Stepping realy contact 160a in this position energizes slow motor relay 168 to switch the screwdriver motor speed control 170 to a slow speed for final rotation in both the forward and reverse directions. When the ball 88 in the flowrater assembly goes up through the photo-switch for the third and final time, the photo-switch contact 156 is again closed to energize the stepping relays 158, 160 and 162 and advances them to the sixth position. Stepping relay contact 162a in this position energizes disable relay 172 to open contact 172a and prevent forward motor rotation after final reverse rotation. Stepping relay contact 158a in the sixth position reverses the motor 64 for the final calibration. Reverse rotation of the screwdriver closes the thermostatic valve in the control to cause the flowrater ball 88 to drop through the photo-switch and energize the stepping relays 158, 160 and 162 once again advancing their contacts to their seventh position. Contact 158a energizes fourth time delay relay 174 for a momentary delay before contact 174a closes to energize stepping relay reset coils 176, 178 and 180 to reset all stepping relay contacts to the number position and contact 176b opens to deenergize start relay 134 and complete the calibration cycle.

The fluid circuit, schematically illustrated in FIG. 4, has three four-way valves 182, 184 and 186, which may be likened to fluid relays, are connected, respectively, to the lockup piston cylinders (of which only 34 is shown), calibration lockup head assembly 44, and the open-close piston cylinder 70. When the solenoid valve associated with a four-way valve is closed, the four-way valve permits fluid from from its inlet to the normally open outlet. When the solenoid valve is open, flow is established through the normally closed outlet.

A source of pressurized fluid 188 is connected to the solenoid valves 138, 140, 144 and 146 and to the four way valves 182, 184 and 186 via conduit 190, filter 192, branched conduit 194, pressure regulators 196 and 198 and conduits 200, 202, 204 and 206. Conduits 208, 210 and 212 connect solenoid valves 138, 140 and 144 to their respective four-way valves 182, 184 and 186; conduits 214 and 216 connect solenoid valve 146 to the control 12 through flowrater 82.

A water heater control is calibrated by the present apparatus in the following manner:

A control 12 is positioned on table 10 with its thermal element 16 depending through slot 14. The "on" switch 130 is closed to energize the temperature-to-motion transducer assembly 24 so that the temperature sensing probe 22 immediately beings to sense the ambient temperature. The start switch 132 is closed to energize the system and actuate the series of piston cylinder devices 26, 28, 30, 32 and 34 which depress the pilot button 36, engage and rotate the control to the "on" position, close-off the pilot outlet port and connect the air pressure supply coupling 42 to the inlet of the control. The temperature-to-motion transducer drives shaft 60, through the gears 52, 54 and 58, to an angular position corresponding to the sensed temperature. Since the calibration lockup head assembly 44 is in the raised position, the couplings 72 and 74 are engaged so that drive shaft 76 is likewise driven to rotate member 102 of the lockup head assembly 44 through engaged gears 110 and 112. The member 102 is positioned with slot 108 in a direction corresponding to the sensed ambient temperature. The lockup head is then locked up by the energization of the solenoid 140 which admits pressurized air through conduit 96 to drive piston 94 downward to frictionally engage flange 104 with the gasket 100. The air cylinder 70 is energized to move the calibration lockup head assembly to engage control 12.

Drive motor 64 rotates the shaft 122 which passes through the center of the calibration head and has a screwdriver blade 124 on the lower end engaging with and rotating the temperature adjustment screw of the control. During this rotation, the slot 108 will line up with the legs of the adjustment clutch spring and the calibration head assembly will drop around the clutch spring holding it firmly to prevent further rotation of the spring. The drive motor 64 will continue to rotate the calibration adjustment screw until the thermostatic valve opens. At this time the ball 88 inside the glass tube 90 of the flowrater assembly 82 is driven upward by the air flow through the control and breaks the photo-electric circuit which in turn reverses the drive of the motor, as explained above in connection with the electrical schematic of FIG. 3. The drive motor in reverse operation rotates the temperature adjustment screw counterclockwise until the thermostatic valve closes stopping the air flow and allowing the ball 88 to drop through the photo-electric circuit. This causes the stepping switches to be advanced again so that the drive motor drives in the forward direction. The temperature adjustment screw is turned in and out by this process several times in order to allow the moving parts of the control to seat themselves and to stabilize. On the final opening and closing by the thermostatic valve, the motor 64 is driven at a reduced speed of rotation by the motor speed control 170 in order to prevent over-shooting of the "off" point. When the temperature adjustment screw is rotated counterclockwise for the final time, closure of the thermostatic valve acts to stop the rotating screwdriver and the water heater control is calibrated.

Calibration at room temperature for an operating calibration of, for example, 155°F at top setting, requires close tracking of the control dial with element temperature. Frequent checks are made on a sampling basis to insure that control calibration tracking is such that the top "off" temperature is within accepted tolerance.

Although the above description primarily describes calibration with a thermal element in air and sensing ambient air temperature, the apparatus is also capable of utilizing liquid temperature bath for the thermal element. With the temperature sensing probe emersed in the bath, control of the temperature will be less critical with the apparatus compensating for variations in the bath temperatures.

It will be apparent to those skilled in the art that many variations of the construction and arrangement of parts made without departing from the scope of the invention and in this respect the described embodiment is to be considered in all respects as illustrative only.

What is claimed is:

1. An apparatus for automatically calibrating a thermostatic control having a control device movable between controlling positions, temperature sensing means connected to move said control device in response to variations from a predetermined temperature and temperature setting means disposed in frictional engagement with a temperature adjustment shaft, said apparatus comprising:

temperature-to-motion transducer means adapted to sense ambient temperature and translate it to a driving motion, calibration head means adapted to be angularly positioned by said driving motion and to engage said clutch spring of the control to be calibrated, means to drive said temperature adjusting shaft between the controlling positions of said control device, and means to determine exactly when said control device reaches one of its controlling positions at which time the angular positioning of said calibration head is imparted to said temperature setting means thereby calibrating said control.

2. An apparatus for automatically calibrating a thermostatic control according to claim 1 wherein said control is a water heater control and said control device is a valve, said apparatus further comprising:

means to feed pressurized fluid to said valve, and said means to determine exactly when said control device reaches a controlling position comprises a flowrater assembly determining flow of said pressurized fluid through said valve.

3. An apparatus according to claim 2 wherein said flowrater comprises a photo-electric circuit having a light source and a light responsive cell, a fluid passing conduit interposed in said photo-electric circuit between said light source and said cell, and means movable in said conduit by fluid flow to break the light path between the light source and cell thus causing an actuation of said photo-electric circuit.

4. An apparatus according to claim 3 further comprising stepping switch means connected to be moved on step for each actuation of said photo-electric circuit, and means to drive said temperature adjusting shaft comprising motor means connected to said stepping switch means, said stepping switch means reversing the direction of rotation of said motor with each advancing step.

5. An apparatus according to claim 2 wherein said water heater control is for a gas water heater and includes a pilot and valve means, said apparatus further comprising means to disable the pilot of said control, and
   means to turn said control on.

6. An apparatus according to claim 1 further comprising means to vertically move said calibration head into and out of engagement with the control to be calibrated;

means drivingly connecting said calibration head means to said temperature-to-motion transducer in the upper portion of said calibration head means, and means to rotatably lock said calibration head means when it is lowered into engagement with the control to be calibrated.

7. An apparatus according to claim 6 wherein said calibration head means comprises a cylindrical member having a slot in one end for engaging said clutch spring of the temperature setting means of the control to be calibrated.

8. An apparatus according to claim 7 wherein said cylindrical member includes an integral annular flange, and said means to rotatably lock said calibration head means comprises piston cylinder means adapted to engage said flange and prevent further rotation of said cylindrical after it is angularly positioned.

9. An apparatus according to claim 8 wherein said means to drive said temperature adjusting shaft comprises a screwdriver blade extending through said cylindrical member and engaging with said shaft in the down position of said calibration head means, and motor means connected to drive said screwdriver blade in both directions of rotation.

10. An apparatus according to claim 9 further comprising:

means responsive to said control device reaching its controlling position and connected to reverse the direction of rotation of said motor each time a controlling position is reached.

11. An apparatus for automatically calibrating a thermostatic control according to claim 1 wherein said control is a space heater control and said control device is an electrical switching means, said apparatus further comprising:

an electrical circuit connected to said switching means, and said means to determine exactly when said control device reaches a controlling position comprises circuit testing means indicating the open or closed state of the circuit.

12. A method of calibrating thermostatic controls of the type used for water heaters and the like which have a control device movable between controlling positions, temperature sensing means connected to move said control device between said positions in response to variations from a predetermined temperature and an adjustable temperature setting means frictionally disposed about a temperature adjustment shaft, comprising the steps of sensing ambient temperature, converting said sensed temperature into rotary drive motion, angularly positioning a calibration head with said drive motion and locking said head at said angular position, engaging said calibration head with the control to be calibrated, driving said temperature setting means of said control sequentially between its controlling portions, and said setting said adjustable portions at a position determined by said sensed ambient temperature when said control device reaches one of its control positions.

13. A method according to claim 12 further comprising:
feeding pressurized fluid to said control, and determining when said fluid is flowing, starting and stopping of the flow corresponding to the control positions of said control device.

* * * * *